Patented May 17, 1938

2,117,334

UNITED STATES PATENT OFFICE 2,117,334

MONOAZO DYESTUFFS AND THEIR PRODUCTION

Arthur Howard Knight, Blackley, England, assignor to Imperial Chemical Industries Limited, a corporation of Great Britain No Drawing. Application May 27, 1936, Serial No. 82,048. In Great Britain June 4, 1935

12 Claims. (Cl. 260—96)

In British specification No. 181,750, United States Patent 1,483,084, there is described the manufacture of azo dyestuffs which dye wool and silk from an acid bath and which owe their solubility and acid character to the presence in their structure of the alcoholic sulphuric acid group —$C_2H_4SO_4H$ attached to nitrogen. Dyestuffs containing this —$C_2H_4SO_4H$ group (including soluble salts thereof) have been called "sulphato" dyestuffs.

In British specification No. 237,739 there is described a process of dyeing acetyl silk by applying certain sulphato monazo dyestuffs, namely, those carrying nitro groups as substituents, from a neutral, acid or alkaline dyebath.

The dyestuffs disclosed in the latter specification are obtained by using as diazo components various mononitro and dinitroamines of the benzene or naphthalene series. The new dyestuffs of the present invention are bluer in shade than the corresponding known dyestuffs derived from nitroamines of the benzene series and are faster to light than the known dyestuffs derived from nitroamines of the naphthalene series.

According to the present invention I manufacture new monoazo dyestuffs by coupling diazotized 2,4,6-trinitro-1-aminobenzene or a homologue thereof, with an N-sulphato-alkyl- or N-alkyl-N-sulphatoalkyl derivative of 3-amino-toluene.

As examples of suitable coupling components there may be mentioned N-sulphatoethyl-3-aminotoluene, N-sulphatobutyl-3-aminotoluene, N - ethyl - N - sulphatopropyl-3-aminotoluene or N-propyl-N-sulphatoethyl-3-aminotoluene.

The coupling may conveniently be carried out by diazotizing the appropriate trinitro compound in concentrated sulphuric acid in the known way, mixing the resulting sulphuric acid solution with a concentrated sulphuric acid solution of the coupling component and then drowning out the total mixture into ice and water, if desired, in the presence of a buffering agent such as sodium acetate. This method of coupling is prefered as giving higher yields of dyestuff but the invention is not limited to the said method. Other known methods of coupling a diazo compound with a couplable amine also come within the scope of my invention.

Also according to the invention I apply the new dyestuffs to the coloring of acetate artificial silk, natural silk, tin-weighted silk, wool and leather.

The new dyestuffs are soluble in water and dye acetate artificial silk from an acid, neutral or alkaline dye bath, in violet to blue shades of good fastness properties and dischargeability. They are also eminently suitable for the direct printing of acetate artificial silk. Also when applied from an acid bath the new dyestuffs dye wool, natural silk, tin-weighted silk and leather in violet to blue shades.

The invention is illustrated but not limited by the following examples, in which the parts are by weight.

Example 1

228 parts of 2,4,6-trinitro-1-aminobenzene are diazotized in the known way by means of nitrosyl sulphuric acid in sulphuric acid monohydrate solution and to the resulting concentrated sulphuric acid solution is added at 0°–10° C. a concentrated sulphuric acid monohydrate solution of 231 parts of 3-N-sulphatoethylamino-toluene. After stirring for about an hour at 0°–10° C., the resulting solution is slowly added to a large quantity of ice with good stirring. Coupling is immediate and the new dyestuff is filtered off, washed with ice-cold water and converted to its sodium salt either by grinding the dyestuff paste with sufficient sodium carbonate or by suspending the dyestuff paste in water and making the mixture alkaline to litmus by addition of sodium carbonate, salting out the dyestuff sodium salt, if necessary, by addition of common salt, and filtering. The paste of the dyestuff sodium salt so obtained is then dried in any suitable way. It forms a dark powder which dissolves in warm water to give reddish-violet solutions and in sulphuric acid to give reddish-yellow solutions. The new dyestuff dyes acetate artificial silk in violet shades when applied from a neutral dye bath containing 1% common salt.

If, in the above example, instead of a concentrated sulphuric acid monohydrate solution of 231 parts of 3-N-sulphatoethylamino-toluene, there is used a concentrated sulphuric acid monohydrate solution of 245 parts of 3-N-$\gamma$-sulphatopropyl-amino-toluene, a dyestuff is obtained which dyes acetate artificial silk in very similar violet shades.

Example 2

228 parts of 2,4,6-trinitro-1-amino-benzene are diazotized in the known way by means of nitrosyl sulphuric acid in sulphuric acid monohydrate solution and to the resulting concentrated sulphuric acid solution is added at 0°–10° C. a solution of 287 parts of 3-N-n-butyl-N-sulphatoethylamino-toluene in 720 parts of sulphuric acid monohydrate. After stirring for a short time the resulting sulphuric acid solution is added slowly to a large quantity of ice with good stirring. The dyestuff so-formed precipitates from solution and is filtered off and washed thoroughly with ice-cold 5% brine. The acid dyestuff paste is suspended in 8000 parts of water and sufficient sodium carbonate is added to make the suspension alkaline to litmus paper. The alkaline mixture is heated to 60° C., filtered if necessary and the resulting dyestuff solution is then salted with 10% common salt (weight for volume). The dyestuff which precipitates is then filtered off, washed with 10% brine and dried. It forms a dark powder which dissolves in water to a reddish-blue solution and in concentrated sulphuric acid to a reddish-yellow solution. It dyes acetate artificial silk in blue shades capable of producing full navy-blue shades in heavy dyeings. It is also suitable for the direct printing of acetate artificial silk.

I claim:

1. Process for the manufacture of new monoazo dyestuffs which comprises coupling a diazotized compound of the group consisting of 2,4,6-trinitro-1-aminobenzene and the homologues thereof with a coupling component of the general formula

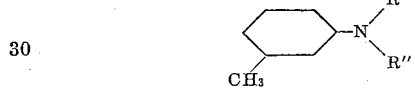

where R' is one of a group consisting of hydrogen and alkyl and R'' is sulphatoalkyl.

2. Process for the manufacture of new monoazo dyestuffs which comprises diazotizing a compound of the group consisting of 2,4,6-trinitro-1-aminobenzene and the homologues thereof in concentrated sulphuric acid, mixing the resulting solution of diazo compound with a concentrated sulphuric acid solution of a compound of the formula

where R' is one of a group consisting of hydrogen and alkyl and R'' is sulphatoalkyl, and drowning out the total mixture into ice and water, if desired, in the presence of a buffering agent such as sodium acetate.

3. The process of making a monoazo dyestuff which comprises diazotizing a 2,4,6-trinitro-1-aminobenzene in concentrated sulphuric acid, mixing the resulting solution of diazo compound with a concentrated sulphuric acid solution of a 3-N-sulphatoalkylamino-toluene in which alkyl is one of the group consisting of ethyl, propyl and butyl, and drowning the mixture in cold water.

4. The process of making a monoazo dyestuff which comprises diazotizing a 2,4,6-trinitro-1-aminobenzene in concentrated sulphuric acid, mixing the resulting solution of diazo compound with a concentrated sulphuric acid solution of a 3-N-alkyl-N-sulphatoalkyl-amino-toluene in which alkyl is one of the group consisting of ethyl, propyl and butyl, and drowning the mixture in cold water.

5. Monoazo dyestuff produced by coupling a diazotized compound of the group consisting of 2,4,6-trinitro-1-aminobenzene and the homologues thereof with a coupling component represented by the formula

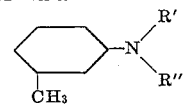

in which R' is one of the group consisting of hydrogen and alkyl, and R'' is sulphatoalkyl.

6. Monoazo dyestuff produced by coupling a diazotized compound of the group consisting of 2,4,6-trinitro-1-aminobenzene and the homologues thereof with a coupling component represented by the formula

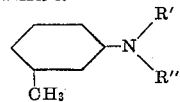

in which R' is one of the group consisting of hydrogen and alkyl, R'' is sulphatoalkyl, and alkyl is one of the group consisting of ethyl, propyl and butyl.

7. Monoazo dyestuff produced by coupling diazotized 2,4,6-trinitro-1-aminobenzene with 3-N-sulphatoalkyl-amino-toluene in which alkyl is one of the group consisting of ethyl and propyl.

8. Monoazo dyestuff produced by coupling diazotized 2,4,6-trinitro-1-aminobenzene with 3-N-sulphatoethylamino-toluene.

9. Monoazo dyestuff produced by coupling diazotized 2,4,6-trinitro-1-amino-benzene with 3-N-alkyl-N-sulphatoalkylaminotoluene.

10. Monoazo dyestuff produced by coupling diazotized 2,4,6-trinitro-1-amino-benzene with 3-N-alkyl-N-sulphatoalkylaminotoluene in which alkyl is one of the group consisting of ethyl, propyl and butyl.

11. Monoazo dyestuff produced by coupling diazotized 2,4,6-trinitro-1-amino-benzene with 3-N-n-butyl-N-sulphatoalkylamino-toluene in which alkyl is one of the group consisting of ethyl, propyl and butyl.

12. Monoazo dyestuff produced by coupling diazotized 2,4,6-trinitro-1-amino-benzene with 3-N-alkyl-N-sulphatoethylamino-toluene in which alkyl is one of the group consisting of ethyl, propyl and butyl.

ARTHUR HOWARD KNIGHT.